United States Patent
Wohrle et al.

(10) Patent No.: US 9,672,730 B2
(45) Date of Patent: Jun. 6, 2017

(54) METHOD AND APPARATUS FOR DIAGNOSIS OF A COMMUNICATION CHANNEL

(71) Applicant: Endress + Hauser Wetzer GmbH + Co. KG, Nesselwang (DE)

(72) Inventors: Markus Wohrle, Eisenberg (DE); Gunter Klotz, Memmingen (DE); Christoph Horn, Fussen (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 468 days.

(21) Appl. No.: 13/939,370

(22) Filed: Jul. 11, 2013

(65) Prior Publication Data

US 2014/0015691 A1    Jan. 16, 2014

Related U.S. Application Data

(60) Provisional application No. 61/671,877, filed on Jul. 16, 2012.

(30) Foreign Application Priority Data

Jul. 16, 2012    (DE) .................. 10 2012 106 375

(51) Int. Cl.
*G08C 19/16* (2006.01)
*H03M 1/12* (2006.01)
(Continued)

(52) U.S. Cl.
CPC ............... *G08C 25/00* (2013.01); *H04B 3/46* (2013.01); *H04B 17/10* (2015.01); *H04B 17/20* (2015.01)

(58) Field of Classification Search
None
See application file for complete search history.

(56) References Cited

U.S. PATENT DOCUMENTS

2004/0113814 A1 *   6/2004   Lochner .................. 340/870.18
2006/0017602 A1     1/2006   Puma
(Continued)

FOREIGN PATENT DOCUMENTS

DE    102004035609 A1    2/2006

OTHER PUBLICATIONS

Philip Quinlan, A Multimode 0.3-200 kb/s Transceiver for the 433/868/915 MHz Bands in 0.25-um CMOS, Dec. 1, 2004, Piscataway, New Jersey.

*Primary Examiner* — Firmin Backer
*Assistant Examiner* — Jerold Murphy
(74) *Attorney, Agent, or Firm* — Bacon & Thomas, PLLC

(57) ABSTRACT

An apparatus for diagnosis of a communication channel, wherein a communication signal serves for data transmission and is a frequency-modulated signal. The apparatus includes a receiving circuit, which serves for receiving the frequency-modulated signal. The receiving circuit includes a monitoring unit, which serves for determining a signal parameter of the frequency-modulated signal. The receiving circuit also includes a demodulator, which serves to demodulate the frequency-modulated signal. The receiving circuit also includes a signal processing unit, which is connected with the demodulator and with the monitoring unit, wherein the signal processing unit, at least at times, serves for evaluating the signal parameter of the frequency-modulated signal determined by means the monitoring unit and, at least at times, for evaluating the demodulated signal.

15 Claims, 1 Drawing Sheet

(51) Int. Cl.
*G08C 25/00* (2006.01)
*H04B 3/46* (2015.01)
*H04B 17/10* (2015.01)
*H04B 17/20* (2015.01)

(56) References Cited

U.S. PATENT DOCUMENTS

2008/0075012 A1    3/2008  Zielinski
2008/0156090 A1*   7/2008  Wehrs .................... 73/290 R

* cited by examiner

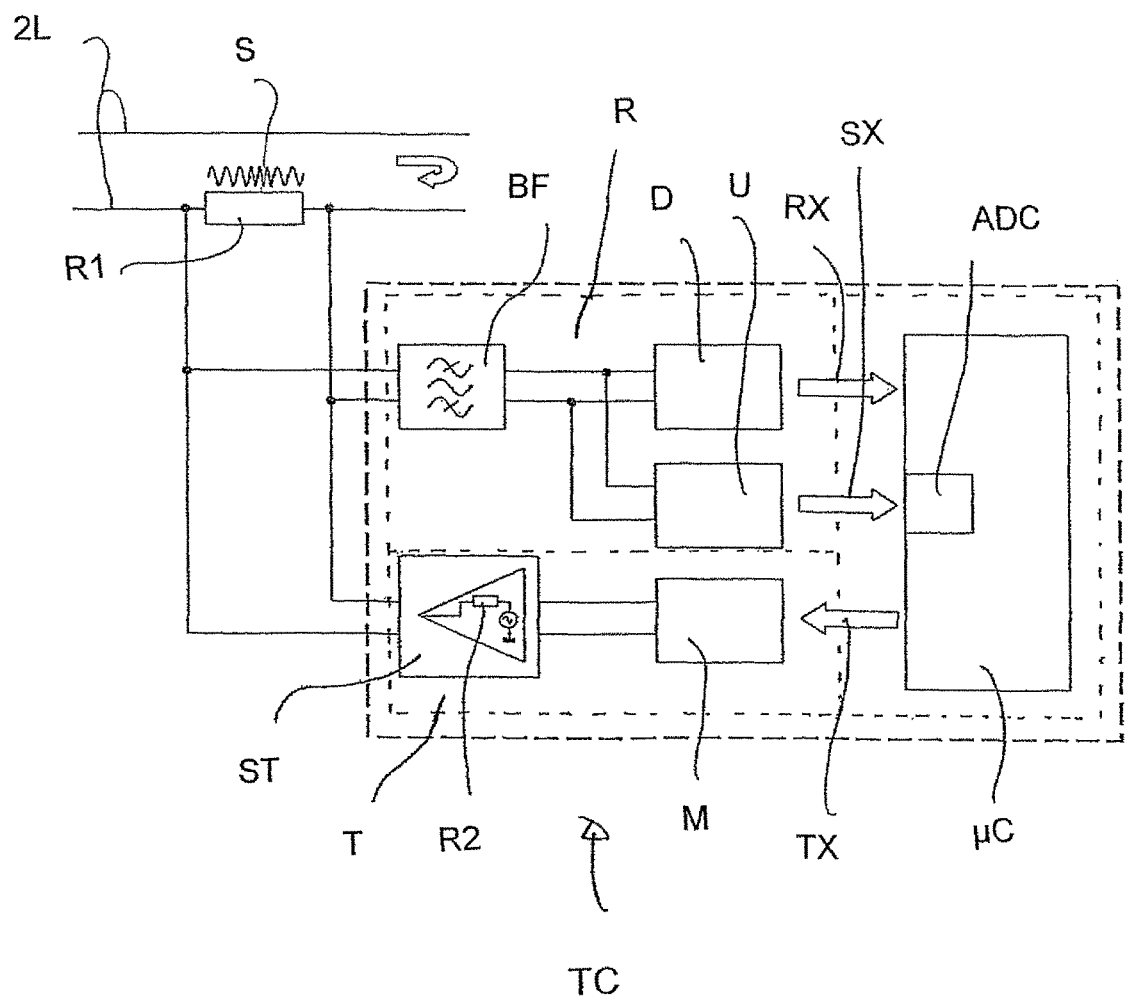

METHOD AND APPARATUS FOR DIAGNOSIS OF A COMMUNICATION CHANNEL

CROSS-REFERENCE TO RELATED APPLICATION

This application is a Nonprovisional application which claims the benefit of U.S. Provisional Application No. 61/671,877 which was filed on Jul. 16, 2013.

The invention relates to an apparatus for diagnosis of a communication channel and to a corresponding method.

BACKGROUND DISCUSSION

Field devices of automation- and/or process measurements technology are applied, for example, in industrial plants and serve there for ascertaining and/or monitoring and/or for displaying a process variable, such as, for example, flow, fill level, pressure, temperature or pH-value of a measured substance or material. These field devices are often connected communicatively among one another and/or with a superordinated unit.

For data transmission between the field devices and/or the superordinated unit, a series of fieldbus systems are known from the state of the art. Currently used for data transmission via the fieldbus systems are standardized protocols, such as, for example, the HART, Profibus or Foundation Fieldbus protocols as well as also different Ethernet standards. The communicative connection between the field devices and/or the superordinated unit is referred to in the following as the communication channel. The communication channel can, on the other hand, such as described in an example of an embodiment of the present invention, be formed of a transmission path for transmission of the frequency-modulated signal between the transmitting unit and the receiving unit of the proposed apparatus, in the case of which such is preferably a field device.

Known from German Patent DE 102007062919 A1 for diagnosis of operating- and environmental conditions of such field devices is an apparatus, which has a control/evaluation unit, which ascertains a present loop current. To this end, a measuring resistor is integrated in the field device.

Furthermore, known from German Patent DE 102009050645 A1 is a field device, in the case of which, for monitoring an analog output signal produced by the field devices, a first read-back channel is present for the analog output signal. The analog output signal is compared with a comparison signal for ascertaining a deviation.

These evaluating- and diagnostic apparatuses known from the state of the art refer, however, all to an analog output signal, or to the information transmitted by means of the communication signal. A (purely) physical evaluation of the fieldbus protocols known from the state of the art can, however, not be achieved in this way. Especially, it is not known from the state of the art to ascertain, based on the (digital) communication signal (per se), the quality of the signal transmission via the fieldbus.

SUMMARY OF THE INVENTION

It is, thus, an object of the present invention to provide for diagnosis of the communication channel operating according to a modern fieldbus protocol.

The object is achieved according to the invention by an apparatus and by a method.

As regards the apparatus, the object is achieved by an apparatus for diagnosis of a communication channel, wherein a communication signal serves for data transmission via the communication channel, and wherein the communication signal is a frequency-modulated signal. This frequency-modulated signal is preferably a frequency-modulated signal in the form of a digital signal. The frequency-modulated signal is in accordance preferably with one of the known standards for data transmission via a fieldbus, such as, for example, the HART standard. The communication channel is preferably a frequency band, in which the frequency-modulated signal exists. Serving as physical path for transmission, i.e. as carrier, of the communication channel is, for example, a two-wire line, via which the communication signal is transmitted. For example, one or more field devices and/or a superordinated unit can be connected to this two-wire line, respectively connected with one another via this two-wire line.

The apparatus includes, furthermore, a receiving circuit, which serves for receiving the frequency-modulated signal. The proposed apparatus can be, for example, part of a field device, which serves for registering and/or displaying a measured variable of a measured material or substance. The receiving circuit can be connected, for example, as a component of the field device, on the one hand, preferably directly, with the two-wire line and, on the other hand, (likewise directly) with operating electronics internal to a field device. Preferably, the operating electronics of a field device as well as also the receiving circuit can be accommodated in a shared housing. The operating electronics of the field device serves, in such case, for performing the primary functions of the field device such as, for example, to displaying, determining and/or monitoring a measured value of a measured material or substance.

The receiving circuit includes, furthermore, a monitoring unit, which serves for determining a signal parameter of the frequency-modulated signal. The receiving circuit includes, also, a demodulator, which serves to demodulate the frequency-modulated signal, wherein the receiving circuit includes a signal processing unit, which is connected with the demodulator and with the monitoring unit. The demodulator and the monitoring unit are thus placed in front of the signal processing unit and provide the signal processing unit with corresponding output signals. The signal processing unit serves, at least at times, for evaluating the signal parameter of the frequency-modulated signal determined by means of the monitoring unit and, at least at times, for evaluating the demodulated signal.

The output signal of the monitoring unit is thus, for example, a signal representing the signal parameter determined by the monitoring unit. The output signal of the demodulator is preferably a digital signal representing the frequency-modulated signal. Thus, the quality of the data transmission is evaluated by the proposed monitoring unit not based on the consistency of the transmitted data, such as, for example, based on a test sum, etc., but, instead, based on the physical signal actually transmitted via the communication channel. Thus, it is not the consistency of the data that is checked, which would require an actual evaluation and, in given cases, complex, energy consuming processing of the communication signal, but, instead, whether a (physical) signal parameter of the communication signal lies, for example, within certain limit values, i.e., for example, above or below a predetermined value. This occurs preferably before the frequency-modulated signal is demodulated by the receiving circuit, respectively a signal processing unit, and/or before the data contained therein, i.e. the wanted signal, is removed.

For example, the frequency-modulated signal can be fed alternately to the demodulator and to the monitoring unit. On the other hand, the frequency-modulated signal can be fed simultaneously to both the monitoring unit and to the demodulator.

The signal processing unit, which is preferably a microprocessor, can serve, for example, in a first operating mode, for evaluating the signal parameter of the frequency-modulated signal and for evaluating the frequency-modulated signal. In the first operating mode, the signal processing unit can thus serve for evaluating the frequency-modulated signal demodulated by means of the demodulator.

In a form of embodiment of the apparatus, the signal processing unit issues a first diagnostic report, when the frequency-modulated signal lies outside a receiving threshold of the demodulator. The proposed demodulator is constructed especially preferably in such a manner that it has a working range with an upper receiving threshold and a lower receiving threshold. If the frequency-modulated signal, especially preferably its amplitude, is outside one of the receiving thresholds and, thus, lies outside of the working range of the demodulator, the demodulator produces no output signal. The signal processing unit can then correspondingly output a first diagnostic report.

In an additional form of embodiment of the apparatus, the signal processing unit issues a second diagnostic report as a function of the signal parameter of the frequency-modulated signal. The signal processing unit can thus output a diagnostic report either as a function of the output signal output by the demodulator or as a function of the value of the signal parameter of the frequency-modulated signal output by the monitoring unit. To this end, the signal processing unit, for determining the diagnostic report, can use either only the output signal of the demodulator or only the output signal of the monitoring unit. Preferably for outputting a diagnostic report, however, both the output signal output by the demodulator as well as also the output signal output by the monitoring unit are used for determining a diagnostic report.

In a form of embodiment of the apparatus, the signal parameter is a value of the communication signal, preferably the amplitude and especially preferably the maximum amplitude, for example, within a predetermined time span. Thus, the monitoring unit cannot only detect the presence of a disturbance via, for example, the demodulator, but, instead, can also draw from the value of the signal parameter of the communication signal other conclusions serving for diagnosis. Thus, for example, the failure of the demodulator can be detected. Furthermore, based on a certain value of the signal parameter, also the presence of a certain cause of the malfunction, for instance an attenuation, can be deduced. Such an evaluating of the communication signal for the case, in which the communication signal lies outside of the working range of the demodulator, would not be possible according to the solutions known from the state of the art, since the signal processing unit, in this case, obtains no output signal at all from the demodulator.

In a form of embodiment of the apparatus, the signal parameter is the transmission amplitude of the communication signal of a communication partner. The proposed apparatus can, such as already mentioned, be part of a field device connected with another field device, i.e. a second communication partner, via a fieldbus. Via such fieldbus, communication signals can be sent in accordance with a fieldbus protocol. Thus, a field device with an apparatus of the invention can serve for monitoring the data traffic on the fieldbus. Especially, in this way, the communication connection between individual fieldbus participants can be monitored and/or diagnosed. Thus, sources of error on the fieldbus, respectively in the case of the data transmission on the fieldbus, can be identified.

In an embodiment of the apparatus, the communication signal is a communication signal in accordance with the HART protocol. Typically, field devices are currently connected for communication purposes with one another and/or with a superordinated unit via a two wire line. For transmission of measured values registered by field devices, both analog as well as also digital reporting methods are known from the state of the art. Thus, a measured value can be transmitted via the two-wire line, for example, in the form an electrical current value between 0 mA and 20 mA, respectively between 4 mA and 20 mA. Modern communication methods utilize, however, digital data transmission, in the case of which a frequency-modulated signal is used for transmission of the data. For example, there are superimposed on a two wire, electrical current loop a 0-20 mA, respectively 4-20 mA, signal and a communication signal in accordance with the HART protocol. In the case of the communication signal in accordance with the HART protocol, it is a signal frequency-modulated in such a manner.

In an embodiment of the apparatus, the receiving circuit includes a bandpass filter connected with the demodulator. Fed to the bandpass filter is an input signal, which, among other things, includes at least the frequency-modulated, communication signal. The bandpass filter serves then preferably to pass-through the frequency band, in which the communication signal exists, and to attenuate the remaining frequencies. The bandpass filter is thus placed in front of the demodulator. Provided between the bandpass filter and the demodulator is a signal tap, which serves to supply the communication signal to the monitoring unit.

In an embodiment of the apparatus, the apparatus includes a transmitting circuit, which serves for transmitting the frequency-modulated signal. The transmitting circuit is, in such case, preferably connected in parallel with the receiving circuit. In this way, a signal produced by the transmitting circuit can be read-back by the receiving circuit.

In an embodiment of the apparatus, the transmitting- and receiving circuit is a HART modem.

In an embodiment of the apparatus, the monitoring unit serves for determining noise superimposed on the communication signal, preferably during a transmitting- and/or receiving pause of the transmitting-, respectively receiving, unit. In an embodiment of the apparatus, the signal processing unit serves to output a second diagnostic report as a function of the noise, respectively the signal to noise ratio, of the communication signal. It is thus provided that the monitoring unit determines a signal to noise ratio of the frequency-modulated signal.

In an embodiment of the apparatus, the apparatus includes an analog to digital converter, which is connected between the monitoring unit and the processing unit and which serves to transform the signal parameter determined by means of the monitoring unit into a digital value. The analog to digital converter can, for example, also be integrated into the signal processing unit.

In an embodiment of the apparatus, the transmitting unit includes a modulator, which serves to modulate a signal output by the signal processing unit and to produce a frequency-modulated, communication signal.

In an embodiment of the apparatus, the apparatus is operable alternately in modulation operation and in demodulation operation, wherein the demodulator is switched off in modulation operation, respectively no signals coming from the demodulator are processed by the signal processing unit, wherein, however, the monitoring circuit in modulation operation determines a signal parameter of the communication signal, which is evaluated by the signal processing unit. In this way, frequency-modulated signals coming from the modulator can be read-back by the demodulator, respectively the monitoring unit, and, thus, for example, a self-monitoring can be performed. For instance, not only communication signals coming from communication partners, but, instead, also communication signals produced by the apparatus, such as, for example, the field device, can be evaluated. Alternatively, communication signals in the form of frequency-modulated signals, which are output by the modulator, can supplementally also be processed by the demodulator.

In a form of embodiment of the apparatus, a measuring resistor is provided, which serves for tapping the communication signal, wherein the signal parameter of the frequency-modulated, communication signal determined during the modulation operation serves to determine a value of the measuring resistor. This measuring resistor can serve to tap the frequency-modulated, communication signal and can, for example, be integrated in the field device. Alternatively, the measuring resistor can be part of the two conductor, electrical current loop. A voltage falling across the measuring resistor can serve for tapping the communication signal from the two conductor, electrical current loop.

The transmitting- and/or receiving unit can be connected in parallel with this measuring resistor. In this way, a voltage divider can be formed, by means of which the resistance value of the measuring resistor is determined.

As regards the method, the object is achieved by a method for diagnosis of a communication channel, via which communication channel data are transmitted by means of a frequency-modulated, communication signal, wherein a signal parameter of the frequency-modulated, communication signal is ascertained and transmitted to a signal processing unit and evaluated by such.

In a form of embodiment of the method, the communication signal is demodulated and the demodulated communication signal transmitted to a signal processing unit and evaluated by such.

As already mentioned, the frequency-modulated signal can, at least at times, be transmitted to the monitoring unit and to the demodulator or alternately, at least at times, only to the demodulator or only to the monitoring unit.

Thus, a method is provided that enables determination of signal parameters of a frequency-modulated signal transmitted via a communication signal. The value of the signal parameter, respectively the values of the signal parameter, can be used for evaluating the quality of the transmission channel. For example, a signal parameter can be the signal level of the communication signal of the transmitting bus participant. Involved in such case can be the transmitting unit of the apparatus or the transmitting unit of another bus participant. Furthermore, the proposed monitoring unit can determine the signal level of the communication signal during a transmitting pause, respectively a receiving pause. Furthermore, signal parameters can also be derived from the signal level. For example, the signal to noise ratio can be determined.

BRIEF DESCRIPTION OF THE DRAWING

The invention will now be explained in greater detail based on the appended drawing, the sole FIGURE of which shows as follows:

FIG. 1 a form of embodiment of the proposed apparatus for monitoring a frequency-modulated, communication signal.

DETAILED DESCRIPTION IN CONJUNCTION WITH THE DRAWING

FIG. 1 shows an equivalent circuit diagram of a two conductor, electrical current loop 2L, to which a receiving circuit R is connected. Via the two conductor, electrical current loop 2L, a frequency-modulated signal S can be transmitted.

The frequency-modulated signal S can be, for example, a signal S that is frequency-modulated according to the HART standard for data transmission. For registering this frequency-modulated signal S, an impedance R1 is provided. Thus, the frequency-modulated signal S can be tapped by measuring a voltage falling across the impedance R1. The impedance R1 can be integrated into the electrical current loop 2L or, however, it can also be integrated into an apparatus connected to the electrical current loop 2L.

In the form of embodiment in FIG. 1, a transmitting/receiving unit TC is connected with the signal tap. The transmitting/receiving unit TC includes a receiving circuit R, which serves for receiving the frequency-modulated signal S. Receiving circuit R has a bandpass filter BF, a demodulator D as well as a monitoring unit U. Since via the electrical current loop 2L, besides the frequency-modulated signal S, also other signals, for example, a 4 to 20 mA signal, can be transmitted, the bandpass filter BF is applied preferably to separate the frequency-modulated signal S from other signals present on the electrical current loop 2L. The filtered signal is then fed to a demodulator D. Demodulator D serves to win back the digital modulation signal coded in the frequency-modulated signal S. The demodulator D produces at its output a digital signal RX, for example, in the form of a binary coded data stream. Data stream RX is fed to an evaluation unit μC, for example, in the form a microprocessor. This microprocessor μC can then evaluate the data transmitted by means of the frequency-modulated signal S. The microprocessor μC serves thus for signal processing.

Besides being fed to the demodulator D, the frequency-modulated signal S, in given cases separated from other signals present in the electrical current loop 2L, is fed to a monitoring unit U. This monitoring unit U can serve, for example, for peak value measurement of the signal level of the frequency-modulated signal S. The monitoring unit can be embodied, for example, in the form of a preferably selective, peak value, rectifier circuit. In this way, the signal level of the frequency-modulated signal can be determined. Thus, the monitoring unit U can determine the amplitude of the frequency-modulated signal S. Such a peak value rectifier is known, for example, from the Skript, Hochschule München Fakultät 04, kap_1neu_v19, August 2011, Abb. 1.23 (course publication, Munich University of Applied Sciences, Faculty 04, chapt_1new_v19, August 2011, FIG. 1.23) by Prof. Dr. H. Zapf and Prof. Dr. C. Muenker.

A corresponding signal representing the amplitude or the voltage level is output from the monitoring unit U as output signal SX. This output signal SX, present, for example, in the form of an analog signal, is in the embodiment of FIG. 1 fed to an analog to digital converter ADC, which converts the analog output signal SX of the monitoring unit U into a digital signal. The analog to digital converter can be provided as a separate component or, such as shown in FIG. 1, be integrated in the microprocessor. Alternatively, the monitoring unit U can also output a digital signal, especially a binary signal, as output signal SX.

The transceiver unit TC further includes a transmitting circuit T, which serves for coupling the frequency-modulated signal S into the two conductor, electrical current loop 2L. For producing this frequency-modulated signal S, there is output from the microprocessor μC, for example, a binary coded data stream TX, which is fed to a modulator M, which produces a frequency-modulated signal S, which is established in the two conductor, electrical current loop 2L by means of a transmitting stage ST. Connected with the signal tap via the impedance R1 are both the receiving circuit R as well as also the transmitting circuit T composed at least of the transmitting stage ST and the modulator M.

The proposed invention enables the quality of the frequency-modulated signal S, in the case of which it is preferably a HART communication signal, to be evaluated and therefrom measures to be derived for preventing communication disturbances. A frictionless operation of the devices connected with one another via the two conductor, electrical current loop 2L depends on disturbance free communication between the communication participants. In order to assure this frictionless, respectively disturbance free, communication, at least a proper device installation must occur at the hardware level. Moreover, external disturbance variables can influence the communication. Disturbance free communication at the hardware level depends on, among other things, correct device wiring, and the choice of a suitable cable, the right value of the communication resistor R2, as well as depending also on electromagnetic disturbances and environmental conditions, such as e.g. temperature, moisture and mechanical loadings, such as, for example, vibrations, present in the process environment.

The present invention enables measuring of a signal parameter of the frequency-modulated signal S. The value, respectively values, of the signal parameter can be used for evaluating, for example, the quality of the transmission channel. The monitoring unit U integrated into the receiving circuit measures for this, according to the form of embodiment in FIG. 1, the peak value of the received signal, i.e. of the frequency-modulated signal S. In this way, for example, the signal level of the transmitting communication participant (not shown), or the signal level in the case of the transmitting of a frequency-modulated signal S by the transmitting stage ST, or the signal level during transmitting- or receiving pauses of the transmitting/receiving unit TC can be determined. From these values, for example, the signal to noise ratio, the transmission levels of the different bus participants, the size of the HART communication resistor R2, the capacitive load of the two conductor, electrical current loop 2L, and electromagnetic disturbances can be ascertained. Serving for determining these characterizing values can be the signal processing unit μC, which is composed, for example, of a microprocessor. For such purpose, for example, the signal parameter and the frequency-modulated signal S, respectively a signal derived therefrom, are evaluated.

The transmitting/receiving unit TC can be, for example, a component of a field device, such as a sensor-, an actuator- or a display unit.

The voltage divider formed by the resistors R1 and R2 can, in the case of transmitting the frequency-modulated signal S via the transmitting stage, be used for determining the impedance R1. For such purpose, the voltage drop across the resistor R1 can be measured by means of the monitoring unit U. In this way, damage, for example, of the resistor R1, can be detected based on the value of the signal parameter of the frequency-modulated signal, in this case, the transmission signal.

The invention claimed is:

1. An apparatus for diagnosis of a communication channel, wherein a communication signal serves for data transmission via the communication channel, and wherein the communication signal is a frequency-modulated signal, the apparatus including:
    a receiving circuit, which serves for receiving the frequency-modulated communication signal, said receiving circuit includes a monitoring unit, which serves for determining a signal parameter of the frequency-modulated signal, a demodulator, which serves to demodulate the frequency-modulated signal, a signal processing unit, which is connected with said demodulator and with said monitoring unit, and
    a measuring resistor which serves for tapping the communication signal, wherein:
    said signal processing unit serves, at least at times, for evaluating the signal parameter of the frequency-modulated signal determined by means of said monitoring unit;
    the apparatus is operable alternately in modulation operation and demodulation operation,
    said demodulator is turned off in modulation operation, respectively no signals coming from said demodulator are processed by said signal processing unit, however, said monitoring unit in modulation operation determines a signal parameter of the communication signal, which is evaluated by said signal processing unit; and
    the signal parameter of the frequency-modulated, communication signal determined during the modulation operation serves to determine a value of the measuring resistor.

2. The apparatus as claimed in claim 1, wherein:
    said signal processing unit serves, at least at times, for evaluating the signal parameter of the frequency-modulated signal determined by means of said monitoring unit and, at least at times, for evaluating the demodulated signal.

3. The apparatus as claimed in claim 1, wherein:
    said signal processing unit outputs a first diagnostic report, when the frequency-modulated signal lies outside a receiving threshold of said demodulator.

4. The apparatus as claimed in claim 1, wherein:
    said signal processing unit outputs a second diagnostic report as a function of the signal parameter of the frequency-modulated signal.

5. The apparatus as claimed in claim 1, wherein:
    the signal parameter is a value of the communication signal, preferably the amplitude and especially preferably the maximum amplitude, for example, during a predetermined time span.

6. The apparatus as claimed in claim 1, wherein:
    the signal parameter is the transmission amplitude of the communication signal of a communication partner.

7. The apparatus as claimed in claim 1, wherein:
    the communication signal is a communication signal in accordance with the HART-protocol.

8. The apparatus as claimed in claim 1, wherein:
    said receiving circuit includes a bandpass filter connected with said demodulator.

9. The apparatus as claimed in claim 1, wherein:
the transmitting and/or receiving unit is connected in parallel with the measuring resistor to form a voltage divider, by means of which said value of the measuring resistor is determined.

10. The apparatus as claimed in claim 1, wherein:
said transmitting- and receiving circuit is a HART modem.

11. The apparatus as claimed in claim 1, wherein:
said monitoring unit serves for determining noise superimposed on the communication signal, preferably during a transmitting- and/or receiving pause of said transmitting, respectively receiving, unit.

12. The apparatus as claimed in claim 1, wherein:
said signal processing unit serves to output a second diagnostic report as a function of the noise, respectively the signal to noise ratio of the communication signal.

13. The apparatus as claimed in claim 1, further comprising:
an analog to digital converter, which is connected with said monitoring unit and with said signal processing unit, and which serves to convert the signal parameter determined by means of said monitoring unit into a digital signal.

14. The apparatus as claimed in claim 1, further comprising:
a transmitting circuit which serves for transmitting the frequency-modulated signal.

15. The apparatus as claimed in claim 14, wherein:
said transmitting unit includes a modulator, which serves to modulate a signal output by said signal processing unit and to produce a frequency-modulated communication signal.

* * * * *